March 24, 1931.                A. A. THOMAS                1,797,886
ELECTRIC THERMOSTAT
Original Filed June 13, 1927
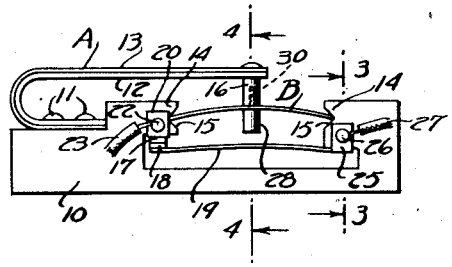
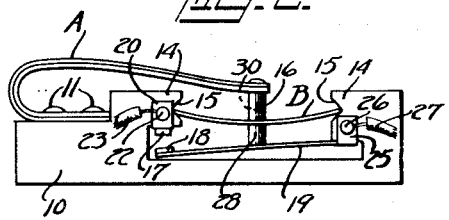
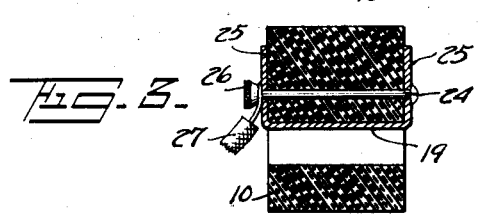
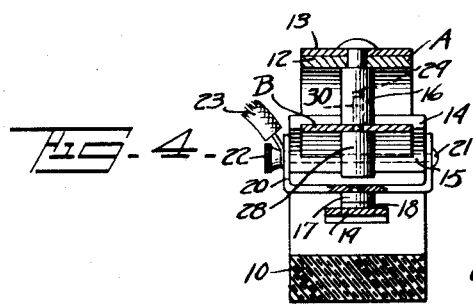
INVENTOR Patented Mar. 24, 1931

1,797,886

UNITED STATES PATENT OFFICE

ADOLPH A. THOMAS, OF NEW YORK, N. Y.

ELECTRIC THERMOSTAT

Application filed June 13, 1927, Serial No. 198,358. Renewed January 20, 1931.

My invention is for a thermostat of novel construction and improved operation for controlling an electric circuit with a snap action, so as to avoid arcing at the contacts. The basic principle of my quick make-and-break switch comprises means whereby positive pressure engagement of the electric contacts is unaffected by the preliminary movements of the thermostatic element toward circuit-breaking position. This is of the most vital importance in a non-arcing thermostat switch. In one embodiment of my invention I connect a buckling spring, usually a curved spring strip or a cupped diaphragm, to a thermostatic element, such as a bimetallic bar or like member. The spring normally resists the movements of the thermostat bar until, at predetermined high and low temperatures, the pressure exerted by the bar on the spring is sufficient to snap the latter into reverse curvature. A resilient contact, separate from the spring and movable independently thereof, normally engages a fixed contact to close an electric circuit. When the spring snaps into reverse curvature at high temperature, it moves the resilient contact suddenly out of engagement with the fixed contact and thereby abruptly opens the circuit. Conversely, when the spring is buckled by the cooling thermostat bar to initial position, the resilient contact quickly moves back to circuit-closing position by its own tension.

As will appear later, my new thermostat can be made in a flat compact structure that is easily installed in electrical devices where but little space is available, such as flatirons and other household electric heating appliances. A simple embodiment of my invention is illustrated in the accompanying drawings, in which—

Fig. 1 shows a thermostat constructed in accordance with my invention, the parts being shown in normal circuit-closing position;

Fig. 2 is a view similar to Fig. 1, with the parts in actuated position to open the circuit;

Fig. 3 is an enlarged cross-sectional view on line 3—3 of Fig. 1, and

Fig. 4 is an enlarged cross-sectional view on line 4—4 of Fig. 1.

The movable parts of the instrument are mounted on a base or frame 10, which may conveniently be made as a single piece either of metal or of insulating material. A thermostat bar A is mounted on frame 10 by bolts 11, or other suitable fastening devices. Although I have shown the bar A as substantially U-shaped, it is manifest that a normally straight bar or any other practical form of thermostat element may be used. The practical advantage of a U-shaped bar is that a greater length of thermostat metal may be housed in a small space. The thermostat bar A is of usual bimetallic construction with an inner strip 12 of iron and an outer strip 13 of brass, or equivalent metals having unequal coefficients of expansion.

The supporting base or frame 10 has a pair of aligned projections 14 in which is mounted a buckling spring B. A simple way of supporting the spring is to provide the projections 14 with bevelled or angular recesses 15 which act like knife-edge bearings for the ends of the spring. Although I have shown the spring member B in the form of a bowed spring strip, it may be in the shape of a cupped or dished diaphragm adapted to buckle into reverse curvature under the action of sufficient external pressure. The free end of the thermostat bar A is rigidly connected to the center of spring B by a bolt or rivet 16, or by any other practical fastening means.

The buckling action of spring B, as will presently be described, controls a pair of switch contacts 17 and 18 mounted on frame 10. The contact 17 is fixed, and the contact 18 is carried by a spring arm 19. A good way to secure contact 17 in position is by means of a U-shaped metal clip or yoke 20 fastened to one of the projections 14 by a bolt or rivet 21, as best shown in Fig. 4. The head 22 of bolt or rivet 21 may serve as a binding post for one of the circuit leads 23. The contact 17 may consist of a separate head or button secured to the fastening yoke 20, as shown in Fig. 4, or it may be an integral part of the yoke. The spring arm 19, which carries contact 18, is secured to the flat frame 10 by a bolt or rivet 24 passing through a pair of ears or side pieces 25 formed as integral extensions of the arm. The head 26 of fastening member 24 may conveniently be used as a binding post for the other circuit conductor 27. The contact 18 may be a separate piece secured to the free end of the resilient supporting arm 19, or it may be formed as an integral part of the arm. The normal inherent set or tension of the arm 19 is such that the contact 18 is pressed firmly against the fixed contact 17 to insure a good closing of the circuit.

The buckling spring B is provided with means for actuating the resilient switch arm 19 to open position when the spring is snapped into reverse curvature by the thermostat bar A at predetermined high temperature. In the broad view of my invention, the switch-opening means connected to the spring B may assume various practical forms, one of which is shown in the drawings as a pin or lug 28 projecting centrally from the spring toward the switch arm 19. The pin 28 may in effect be part of rivet 16, which is provided with an axial bore 29 for receiving a projection 30 on pin 28. The hole 29 and projection 30 may be screw-threaded to effect a rigid connection between the parts 16 and 28. Although I have referred to pin 28 as connected to the spring B, it is equally correct to say that the pin is connected to the bar A.

As long as the buckling spring B is in normal position, as shown in Fig. 1, the contacts 17 and 18 remain in firm pressure engagement to close the circuit. As the temperature of the thermostat bar increases, its free end wants to move downwardly, but the spring B resists such movement until a point is reached when the thermostatic pressure at the free end of bar A overcomes the resistance of the spring, whereupon the latter is suddenly snapped downwardly into a position of reverse curvature, as roughly illustrated in Fig. 2. The sudden downward movement of spring B causes the projecting pin 28 to strike the switch arm 19 away from the fixed contact 17. This opens the circuit so abruptly that no arcing or burning of the contacts takes place. Since the pin 28 engages the spring arm 19 at or near its center, it is evident that the free end of the arm moves in amplified relation to the pin 28, so that a large circuit gap is obtained. This wide gap insures the absence of destructive arcing at the moment of opening.

As the thermostat bar A begins to cool, after having moved into the position shown in Fig. 2, it tends to assume its original shape and the free end of the bar therefore exerts upward pressure on the buckling spring B. The return of the thermostat bar is resisted by the spring until the increasing upward pressure of the cooling bar overcomes the opposition of the spring, whereupon the latter is snapped back to initial position. When that happens, the pin 28 is quickly withdrawn from the switch arm 19 and the latter instantly snaps back to circuit-closing position by virtue of its inherent tension.

Whatever slight preliminary movements may occur at the free end of bar A and at the center of spring B before the critically high temperature is reached, they do not affect the switch arm 19, which holds the circuit firmly closed until the buckling operation of the spring takes place. Likewise, whatever movements of the parts A and B (and, therefore, of pin 28) may occur as the bar A begins to cool, before the spring B is buckled back to initial position, such preliminary movements will be insufficient to cause any appreciable movement of arm 19 toward circuit-closing position. The contacts 17 and 18 remain widely separated until the spring B is snapped back to original position by the cooling thermostat bar A.

The high and low temperatures at which the thermostat bar A buckles the spring B may be predetermined by properly designing those parts. That is a matter of shop experiment for the skilled mechanic. Thermostatic metal and spring metal are obtainable in the market in different sizes and degrees of strength. By the so-called "try it and see" methods, the correct dimensions of bar A and spring B can be determined for breaking the circuit at a certain high temperature, which will naturally vary in different types of electric heating appliances. When once the correct dimensions of thermostat bar A and buckling spring B are obtained for a given type of instrument, it is easy to calibrate all like instruments for mass production.

It is hardly necessary to add that Figs. 1 and 2 are largely diagrammatic and are not intended to show the parts in mathematically correct proportions. The curvature of spring B has been purposely exaggerated to make the drawings easier to understand. The exact shape which the thermostat bar A assumes when the spring B buckles into reverse curvature is difficult to show in the drawings, and the position of bar A in Fig. 2 is therefore to be regarded as merely diagrammatic or approximate. When in the specification and claims I speak of the thermostat bar being connected to the center of the curved spring member B, I do not, of course, mean the mathematical center of the spring, but I mean at or near its central point.

Although I have shown and described a specific construction, I want it understood that my invention is not limited to the details set forth, for the basic principle thereof may be mechanically embodied in various other ways than above described by way of example. Changes and modifications will doubtless occur to the experienced thermostat maker without departing from the scope of the invention as defined in the following claims.

I claim as my invention:

1. An electric thermostat comprising a bowed spring member adapted to reverse its curvature abruptly by external pressure, a fixed contact, a resilient arm mounted independently of said spring member and normally held by inherent tension in pressure engagement with said fixed contact to close an electric circuit, a projection on said spring member for suddenly moving said arm against its normal tension away from said contact when said member reverses its normal curvature, said arm being normally out of contact with said projection, whereby said spring and said arm are capable of independent movement, and thermostatic means rigidly connected to said spring member for snapping the same into reverse curvature at predetermined high and low temperatures, the return of said spring member to initial position causing said projection to release said resilient arm which automatically snaps back into pressure engagement with said stationary contact to close the circuit.

2. An electric thermostat comprising a supporting frame, a buckling spring mounted on said frame and adapted to snap into reverse curvature by external pressure, a fixed contact on said frame, a resiliently mounted contact secured to said frame independently of said spring and normally held by inherent tension in pressure engagement with said fixed contact to close an electric circuit, said spring and said resilient contact being capable of independent movement, a thermostat bar mounted on said frame and rigidly connected to the center of said spring for actuating the same into reverse curvature at predetermined changes of temperature, means on said spring for abruptly moving said resiliently mounted contact away from said fixed contact when the spring is buckled by said thermostat bar at high temperature, whereby the circuit is quickly broken, said resiliently mounted contact being automatically released to move abruptly by its inherent tension into normal circuit-closing position when the spring is snapped back to initial position by the thermostat bar on cooling, and means whereby the preliminary movements of said spring and bar toward circuit-breaking position do not affect the circuit-closing position of said movable contact.

3. An electric thermostat comprising a supporting frame, a buckling spring mounted on said frame and adapted to snap into reverse curvature by external pressure, a fixed contact on said frame, a resiliently mounted contact secured to said frame independently of said spring and normally engaging said fixed contact to close an electric circuit, a thermostat bar mounted on said frame, a fastening member passing through said bar and said spring for rigidly securing these parts together, and an extension on said member for abruptly moving said resiliently mounted contact away from said fixed contact when the spring is buckled by said thermostat bar at high temperature, whereby the circuit is quickly broken, said resiliently mounted contact automatically moving into normal circuit-closing position when the spring is snapped back to initial position by the thermostat bar on cooling.

4. In an electric thermostat, a flat supporting frame, a buckling spring supported in said frame, a thermostat bar mounted at one end on said frame and at the other end rigidly connected to the center of said spring for snapping the same into reverse curvature under predetermined changes of temperature, said spring and said bar being arranged in the plane of said supporting frame to produce a flat construction, a stationary contact carried by said frame, a spring arm mounted at one end on said frame and at its free end normally held by inherent tension in pressure engagement with said stationary contact to close an electric circuit, said buckling spring and said spring arm being capable of independent movement, and means adapted to engage said spring arm and move it abruptly against its normal tension away from the stationary contact when the spring is snapped into reverse curvature by the thermostat bar at predetermined high temperature, said spring arm automatically moving into circuit-closing position when the thermostat bar on cooling snaps the buckling spring back to initial position.

5. In an electric thermostat, a flat supporting frame provided with a pair of spaced projections, a buckling spring supported at its ends on said projections, a thermostat bar mounted at one end on said frame and at the other end rigidly connected to the center of said spring for snapping the same into reverse curvature under predetermined changes of temperature, said spring and said bar being arranged in the plane of said supporting frame to produce a flat construction, a stationary contact secured to one of said projections, a spring arm secured at one end to the other projection and at its free end normally engaging said stationary contact to close an electric circuit, and means extending from said spring to engage said spring arm and move it abruptly away from the stationary contact when the spring is snapped into reverse curvature by the thermostat bar at predetermined high temperature, said engaging means releasing said spring arm and allowing the same to move abruptly by its inherent tension into circuit-closing position when the thermostat bar on cooling snaps the buckling spring back to initial position, said spring arm being normally out of contact with said engaging means, whereby said buckling spring and thermostat bar can move independently of said spring arm.

6. An electric thermostat comprising a buckling spring, a thermostat bar rigidly connected to the center of said spring to snap the same into reverse curvature at predetermined high and low temperatures, and electric contact means controlled by the movements of said spring for abruptly opening and closing an electric circuit, said contact means comprising a stationary contact and a resilient arm both mounted independently of said spring, said arm being normally held by inherent tension against said stationary contact.

7. An electric thermostat comprising a buckling spring, a stationary contact, a resilient arm mounted to move independently of said spring and normally held by inherent tension against said contact to close an electric circuit, thermostatic means for buckling said spring at certain high and low temperatures, and means for abruptly actuating said arm against its normal tension away from said contact during the buckling of said spring at high temperature, the normal circuit-closing position of said arm being unaffected by the preliminary movements of said spring and said thermostatic means, said actuating means suddenly releasing said arm during the return movement of said spring so that the arm snaps back to normal position by its inherent tension.

8. An electric thermostat comprising a bowed spring member adapted to reverse its curvature abruptly by external pressure, a stationary contact, a resilient arm mounted independently of said spring member and normally held by its inherent tension in pressure engagement with said stationary contact to close an electric circuit, said spring member and resilient arm being normally out of contact with each other and capable of independent movement, a thermostat bar rigidly connected to the center of said spring member for snapping the same into reverse curvature, said spring member restraining the thermostatic movements of said bar until predetermined high and low temperature limits are reached, and means for abruptly striking said arm away from said stationary contact after said spring member has moved a certain distance in reversing its curvature, the return of said spring member to initial position automatically releasing said arm which snaps back into engagement with said contact.

9. A quick make-and-break switch comprising a plurality of contact members normally in pressure engagement to close an electric circuit, thermostatic means for abruptly separating said contacts at predetermined high temperature, and means whereby the positive pressure engagement of said contacts is unaffected by the preliminary movements of said thermostatic means.

10. A quick make-and-break switch comprising a snap-over member, thermostatic means for actuating said member abruptly from one position to the other, switch contacts adapted to be opened and closed abruptly by the snap-over movements of said member, and means whereby the preliminary movements of said thermostatic means toward circuit-breaking position do not affect the circuit-closing position of said contacts.

11. A quick make-and-break switch comprising at least two contact members, one of which is movable and normally in pressure engagement with the other member, thermostatic means for abruptly striking said movable member a positive blow in response to predetermined thermal conditions so that said switch members are quickly forced apart to prevent arcing, and means whereby a positive contact pressure is maintained between said members irrespective of the preliminary movements of said thermostatic means.

12. A quick make-and-break switch comprising a plurality of contact members normally in pressure engagement to close an electric circuit, one of said members being movable, a thermostatic element, means whereby the movements of said element at predetermined high and low temperature limits abruptly open and close the circuit by the operation of said movable contact member, and means whereby the circuit-closing position of said movable contact member is unaffected by the preliminary movements of said thermostatic element toward circuit-breaking position.

13. A quick make-and-break switch comprising a buckling member adapted to reverse its curvature with a snap action, a thermostatic element for actuating said member from one position to the other at predetermined temperature changes, switch contacts normally held in pressure engagement and adapted to be abruptly opened and closed by the snap-over movements of said buckling member, and means whereby the positive pressure of said switch contacts in normal position is unaffected by the preliminary movements of said thermostatic element toward circuit-breaking position.

14. A quick make-and-break switch comprising a plurality of contact members normally in pressure engagement to close an electric circuit, one of said members being movable, and a thermostatic device adapted to operate with a snap action under predetermined thermal conditions and arranged to actuate said movable contact member abruptly to circuit-breaking position, there being a lost-motion connection between said member and device whereby the preliminary thermostatic movements of said device toward circuit-breaking position do not affect the normal pressure engagement of said contact members, which remain positively closed until abruptly separated by the snap-over operation of said thermostatic device.

ADOLPH A. THOMAS.